US012577053B1

(12) United States Patent
Ebadian et al.

(10) Patent No.: US 12,577,053 B1
(45) Date of Patent: Mar. 17, 2026

(54) CONVEYOR APPARATUS FOR ELECTRONIC WASTE TRANSFER

(71) Applicant: PHISTON TECHNOLOGIES, Inc., Miramar, FL (US)

(72) Inventors: M. Ali Ebadian, Miramar, FL (US); Raul Travieso, Miramar, FL (US); Alejandro Paya, Miramar, FL (US)

(73) Assignee: Phiston Technologies, Inc., Miramar, FL (US)

( * ) Notice: Subject to any disclaimer, the term of this patent is extended or adjusted under 35 U.S.C. 154(b) by 0 days.

(21) Appl. No.: 19/350,685

(22) Filed: Oct. 6, 2025

(51) Int. Cl.
| | |
|---|---|
| *B65G 15/42* | (2006.01) |
| *B65G 15/44* | (2006.01) |
| *B65G 15/56* | (2006.01) |
| *B65G 17/00* | (2006.01) |
| *B65G 21/08* | (2006.01) |
| *B65G 25/02* | (2006.01) |

(52) U.S. Cl.
CPC ............. *B65G 15/44* (2013.01); *B65G 15/42* (2013.01); *B65G 15/56* (2013.01); *B65G 17/00* (2013.01); *B65G 21/08* (2013.01); *B65G 25/02* (2013.01); *B65G 2201/047* (2013.01)

(58) Field of Classification Search
CPC ........ B65G 15/44; B65G 15/42; B65G 15/56; B65G 17/00; B65G 21/08; B65G 25/02; B65G 2201/047
USPC ............ 198/698, 699.1, 860.3, 860.5, 478.1, 198/550.01, 621.4
See application file for complete search history.

(56) References Cited

U.S. PATENT DOCUMENTS

| | | | | |
|---|---|---|---|---|
| 3,895,982 | A * | 7/1975 | Persson ................... | B32B 15/06 428/167 |
| 4,024,949 | A * | 5/1977 | Kleysteuber ........... | B65G 17/02 198/830 |
| 4,718,541 | A * | 1/1988 | Wilding ............... | B65G 17/067 198/845 |
| 5,967,293 | A * | 10/1999 | Gaines ................. | H05K 13/028 198/531 |
| 8,292,065 | B1 * | 10/2012 | Neufeld ................ | B65G 15/42 198/716 |
| 2002/0179420 | A1 * | 12/2002 | Enomoto ........... | B23Q 11/0057 198/860.3 |

FOREIGN PATENT DOCUMENTS

| | | | | |
|---|---|---|---|---|
| CA | 3086857 | A1 * | 1/2021 | ........... E21B 43/267 |
| WO | WO-2006120299 | A1 * | 11/2006 | ............. B02C 23/02 |

* cited by examiner

*Primary Examiner* — Thomas Randazzo
(74) *Attorney, Agent, or Firm* — McHale & Slavin, P.A.

(57) ABSTRACT

A shielded conveyor apparatus for use with a shredder machine to transfer shredded material. The conveyor apparatus includes a base supporting an inclined ramp with a bottom inlet and a top discharge. A conveyor belt, driven by a motor positioned adjacent the top discharge, is shielded along its length by a cover and viewable through sight glasses. The belt is formed with opposed side walls and spaced barrier walls extending from its surface to define material-carrying pockets that control the quantity of material transported while preventing spillage during rotation. The conveyor couples to a shredder machine housing one or more sets of shredder teeth driven by motors to process objects of varying sizes, including hard drives, solid state drives, CDs, and USB cards. Shredded material exits the shredder through a chute and enters the conveyor inlet for controlled transfer to a discharge or collection bin.

7 Claims, 7 Drawing Sheets

SECTION A-A

CONVEYOR APPARATUS FOR ELECTRONIC WASTE TRANSFER

FIELD OF THE INVENTION

This invention is related to the field of data destruction and, in particular, to a conveyor apparatus for transferring shredded material post data destruction.

BACKGROUND OF THE INVENTION

Electronic data commonly stored on hard disk drives "HDD," solid state drives "SSD," and the like storage devices. The storage devices are coupled to motherboards, switches, caddies, brackets, and the like; components which may be difficult to separate when the storage device has to be replaced or otherwise disposed of. In many applications, it is critical that the electronic data stored on the devices is discarded and unrecoverable. The release of sensitive data placed on the storage devices can be catastrophic. Loss of date can result in trade secret theft and loss of a business advantage over a competitor. Loss of sensitive data can result in identity theft, and the resulting harm can be irreparable. Data storage devices can be changed due to lack of capacity or speed, mechanical malfunction, or simply due to a computer hardware/software upgrade. It is not always practical to separate the data storage device from the underlying supporting components. For this reason, it is not uncommon for the entire computer to be disposed of. While certain types of devices used to store electronic media is easily removed, switchboxes, solid state drives, and other devices that may employ flash memory may require absolute destruction to help ensure that meaningful data cannot be extracted from the disks. Waste created by support components such as high-capacity hard drives with brackets or sleds, heat resistant magnetic recording (HAMR), microwave assisted magnetic recording (MAMR), perpendicular magnetic recording (PMR), rack switches, switch boxes, spindles, and so forth can be shredded and disposed of. While apparatuses exist for shredding material, the amount of waste produced can quickly fill up a catch bin which is typically placed at a position to accept the shredder material. The waste in many instances is less than 2 mm×2 mm in size wherein a transfer bin can accept a large amount of shredded waste.

When the data storage device is replaced, the only secure method of data destruction is for the storage device to be removed from service and shredded wherein the data cannot be retrieved. Various data destroying devices are described in Applicant's prior patents including U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid State Drive Disintegrator; U.S. Pat. No. 10,242,699 for a Single Pulse Degaussing Device; U.S. Pat. No. 10,657,345 for a Media Destruction Verification Apparatus; U.S. Pat. No. 11,400,457 for a Solid State Drive Media Destroyer; U.S. Pat. No. 11,267,647 for a Security Bin; and U.S. Pat. No. 11,389,805 for a Method and Apparatus for HDD and Electronic Waste Disposal.

While the ability to shred ancillary equipment associated with a data storage device, the amount of waste can quickly fill a catch bin. What is needed is an apparatus that can attach to most any data storage shredder for transferring shredded material to a transfer bin designed for moving high weights and volume.

SUMMARY OF THE INVENTION

Disclosed is a conveyor apparatus for lifting electronic waste from a shredding machine to a transfer bin. The apparatus allows seamless alignment with the outlets of existing shredding machines employing lower mounted catch bins. The conveyor integrates with safety guards, interlocks, and a monitoring system to maintain operator safety and track operational data. Materials of construction reduce vibration and enable precise feed rates into and out of the shredding device.

The conveyor belt is positioned beneath a shredder to catch and carry shredded material. It includes a continuous base with divider walls spaced along its surface to segment the flow. The base is constructed of a flexible material with high tensile strength, load-bearing capacity, and excellent flex and fatigue life. Side walls are formed integrally with the base of the conveyor belt, each side wall incorporating corrugations that allow the side walls to compress during inward turns and expand during outward turns. Together, the base, divider walls, and side walls define continuous pockets that receive shredded material and transport it without loss. The side walls maintain their height throughout belt movement, preventing shredded material from spilling over the edges during rotation of the belt. Suitable materials for constructing the conveyor belt include polyurethane, PVC, natural rubber, neoprene, nitrile, EPDM, silicone, or thermoplastic elastomers.

An objective of the invention is to provide an apparatus that allows ease of shredded material transfer and eliminates the need for an individual to lift transfer bins.

Still another objective of the invention is to teach the use of a conveyor forming pockets throughout rotation.

Another objective of the invention is allowing the use of large transfer bins designed for moving heavy materials allowing continuous operation of the shredding machines.

Still another objective of the invention is to provide a transfer system that eliminates the need for an operator to lift a transfer bin and extend the time between bin transfers.

Other objectives and advantages of this invention will become apparent from the following description taken in conjunction with any accompanying drawings wherein are set forth, by way of illustration and example, certain embodiments of this invention.

DETAILED DESCRIPTION OF THE INVENTION

Figures 1A, 1B, 1C:
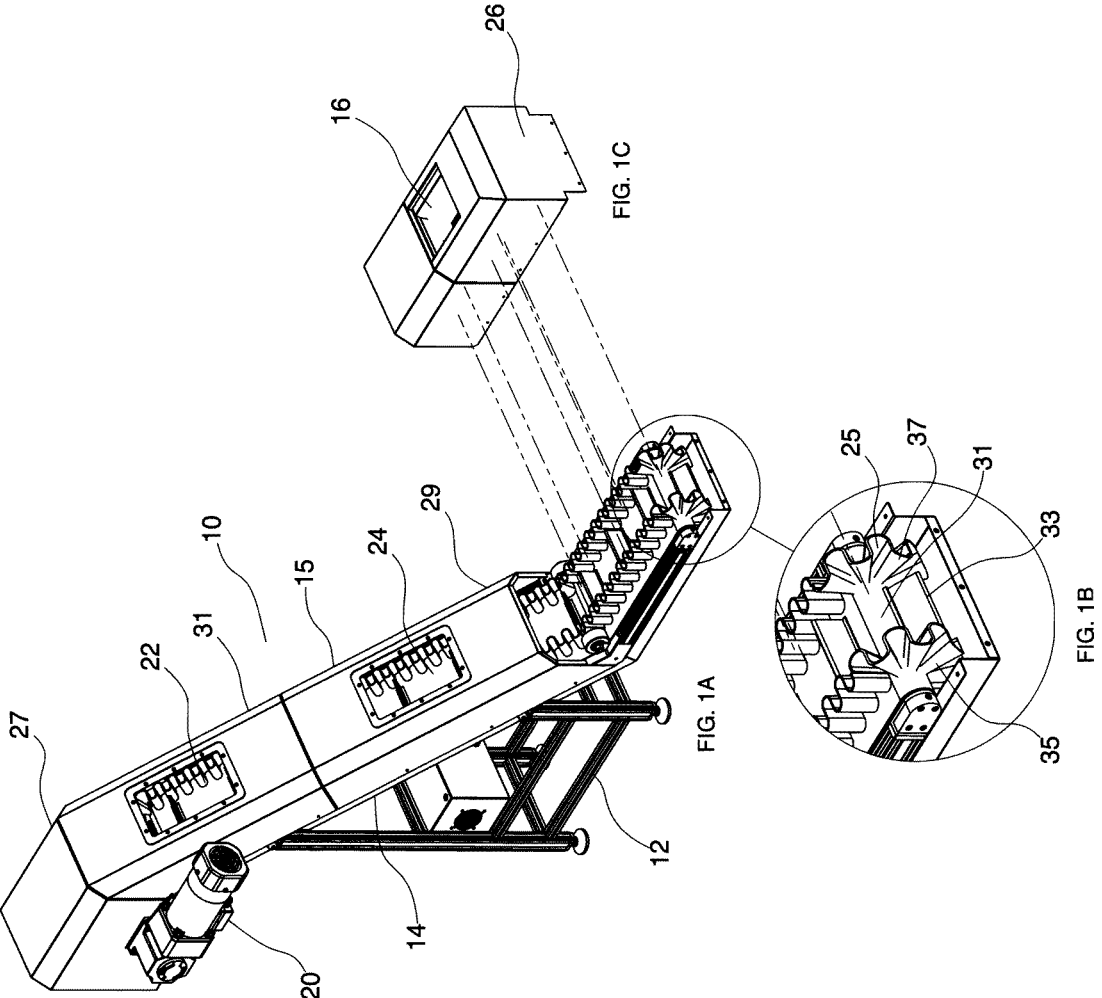
FIG. 1A is a perspective view of a conveyor apparatus for electronic waste transfer.
FIG. 1B illustrates a cover removed from the conveyor apparatus illustrated in FIG. 1A.
FIG. 1C is an enlarged view of the conveyor belt depicted in FIG. 1A.

While the present invention is susceptible to embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1A-1C, illustrated is the shielded conveyor apparatus 10 having a base 12 supporting an inclined ramp 14 having a bottom inlet 16 and top discharge 18. A motor 20 is positioned adjacent to the top discharge 18 for rotation of a conveyor belt 25 which can be viewed through sight glass 22 and 24. The conveyor belt 25 is accessible through the bottom inlet 16 which is placed beneath a discharge port. A shield 15 is used to cover the conveyor belt extending from a lower cover 26 to an upper cover 27 placed over the top discharge 18 using interim shields 29 and 31. The lower cover 26 includes an inlet 16 positionable beneath a shredder discharge of a shredder machine. The shields are constructed from sheet metal or plastic.

The conveyor belt 25 is further defined as a base 31 forming a continuous length with divider walls 33 spaced apart along the length thereof preferably constructed of a flexible material having high tensile strength, load-bearing, and good flex/fatigue life. A first side wall 35 and a second side wall are formed integral with said base 31 employing corrugations allowing the side walls to compress during inward turns and expand during outward turns. The base 31, divider walls 33 and side walls 35, 37 form continuous pockets to move material without loss. The side walls 35, 37 maintain their height during movement which inhibits material from falling over the side walls during rotation of the belt 25. Materials suitable for conveyor belt construction can be selected from the group consisting of: Polyurethane; PVC (vinyl); Natural Rubber, Neoprene, Nitrile, EPDM, Silicone, or Thermoplastic Elastomers.

Figure 2:
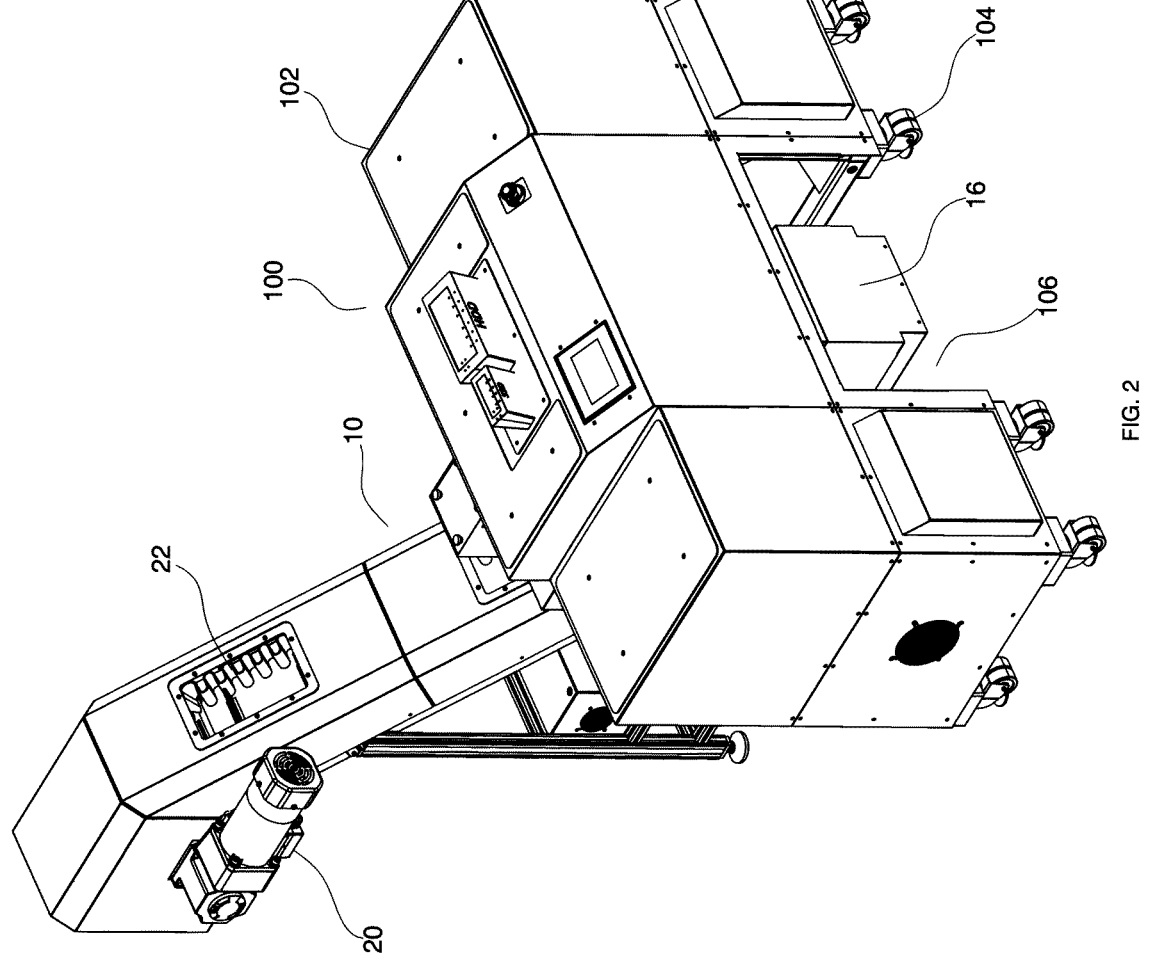
FIG. 2 is a perspective view of the conveyor apparatus adjoined to a shredder machine.

FIG. 2 depicts a shredder machine 100 having a housing 102 that conceals the rotating shredders. The shredder machine 100 may be mounted on wheels 104 with a bin access area 106 that can be used for housing of a transfer bin, not shown, or the bottom inlet 16 of the conveyor apparatus 10.

Figure 3:
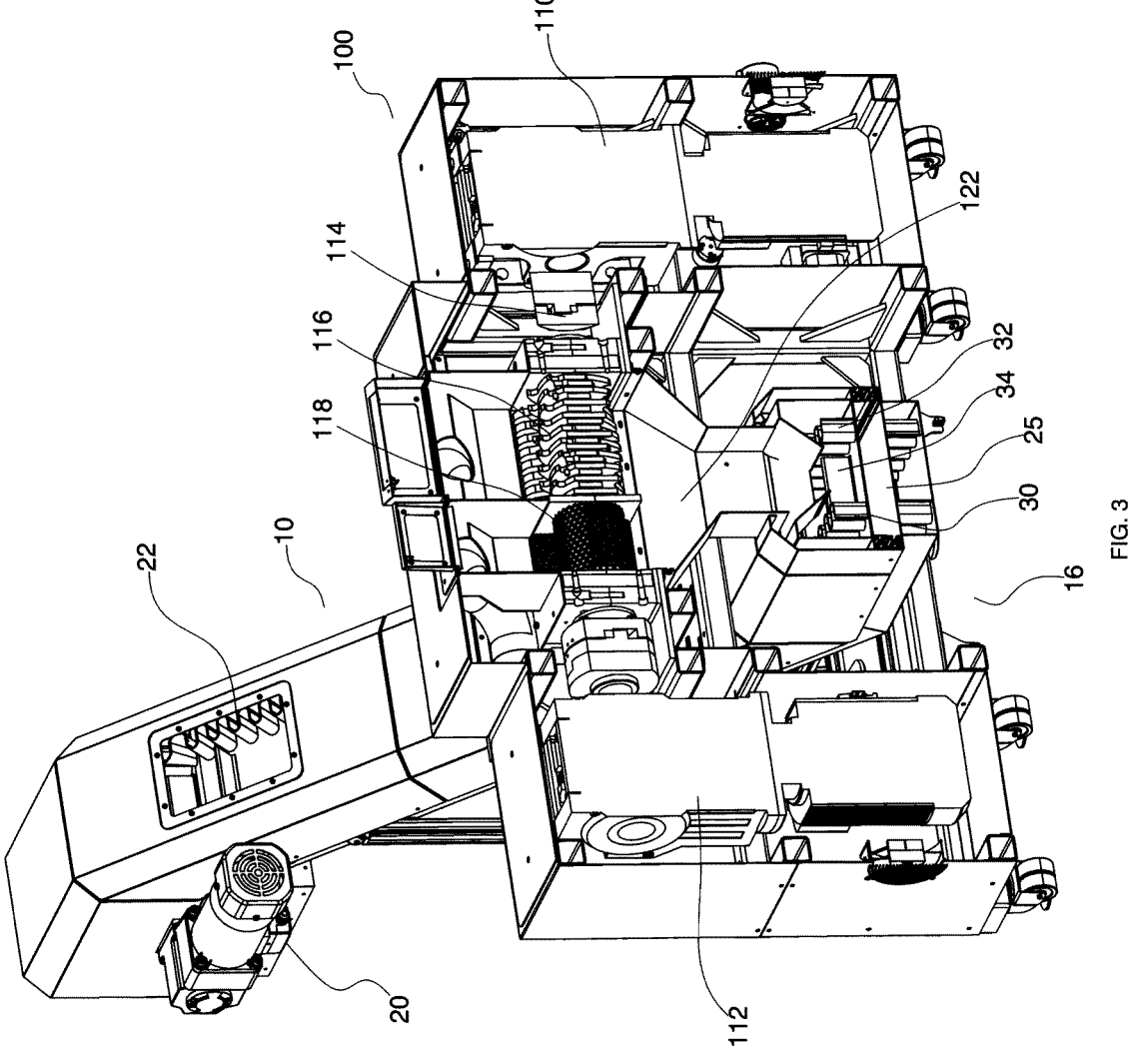
FIG. 3 is a cross sectional view of a shredder machine coupled to the conveyor apparatus.

FIG. 3 illustrates the shredder machine 100 having drive motors 110, 112 coupled to a drive shaft 114 for rotation of shredder teeth 116 for larger objects such as hard disk or solid state drives, and shredder teeth 118 for smaller objects such as CD's, USB cards, and the like. The conveyor apparatus 10 having the bottom inlet 16. Shredded material drops from the large shredder teeth 116 and small shredder teeth 118 through the guide shoot 122. The conveyor belt 25 formed from a flexible material having first continuous side wall 30 spaced apart from a second continuous side wall 32. A plurality of barrier walls 34 protrudes from the surface 36 of the belt 25 at a predetermined distance. As the belt 25 rotates, the first and second wall 30 & 32 cooperated with a first and second barrier wall 34 forming pockets to facilitate transfer of material, wherein each pocket is limited in how much material can be carried. The side walls 30, 32 prevents shredded material from falling off the belt during rotation.

Figure 4:
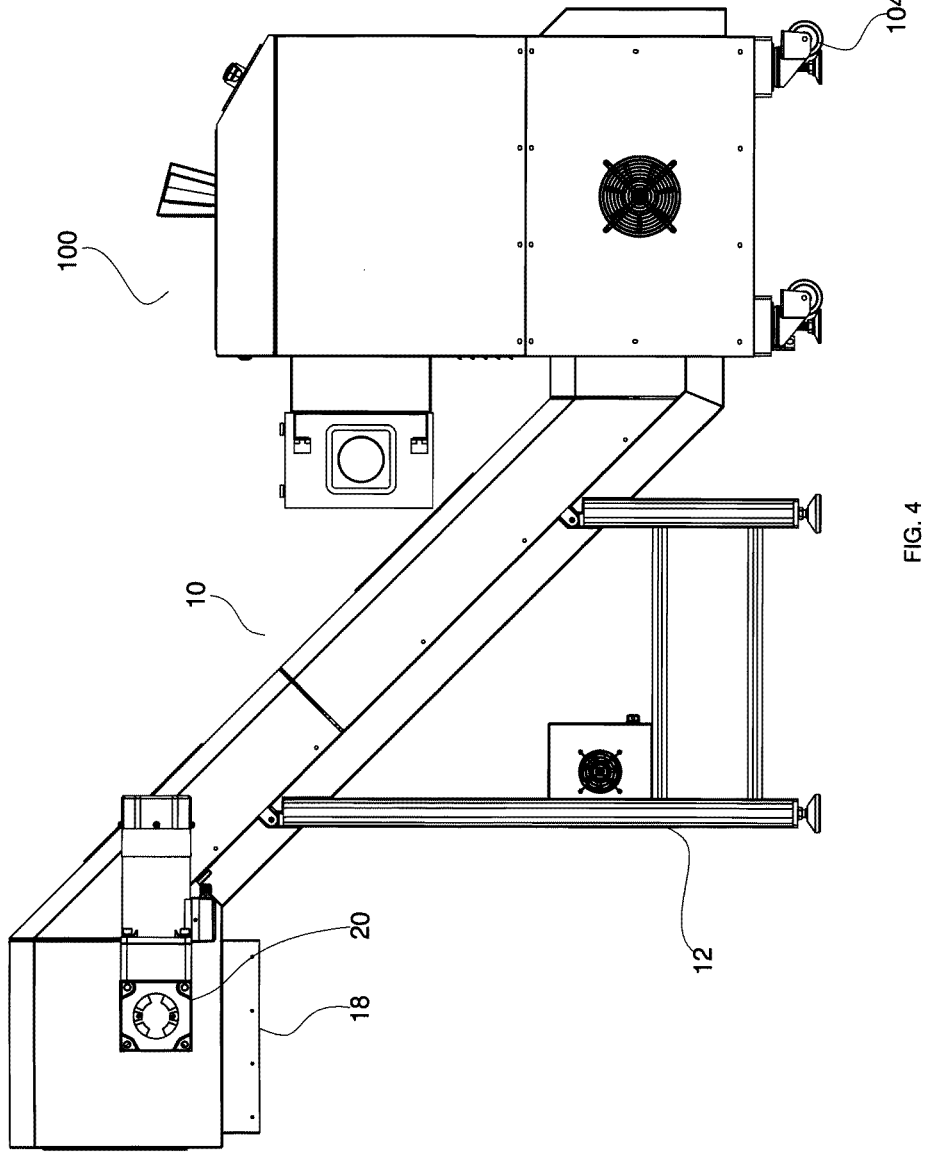
FIG. 4 is a side view of a shredder machine and conveyor apparatus.

FIG. 4 illustrates a side view of the conveyor apparatus 10 having a base 12 supporting an inclined ramp 14 with a top discharge 18. The motor 20 is positioned adjacent to the top discharge 18 for rotation of a conveyor belt 25 with an idler roller 40 to keep the conveyor belt 25 along the inclined ramp 14. The shredder machine 100 having a housing 102 that conceals the shredders. The shredder machine 100 can be serviced from the back side 110 with a bin access area 106 for receipt of the bottom inlet of the conveyor apparatus 10.

Figure 5:
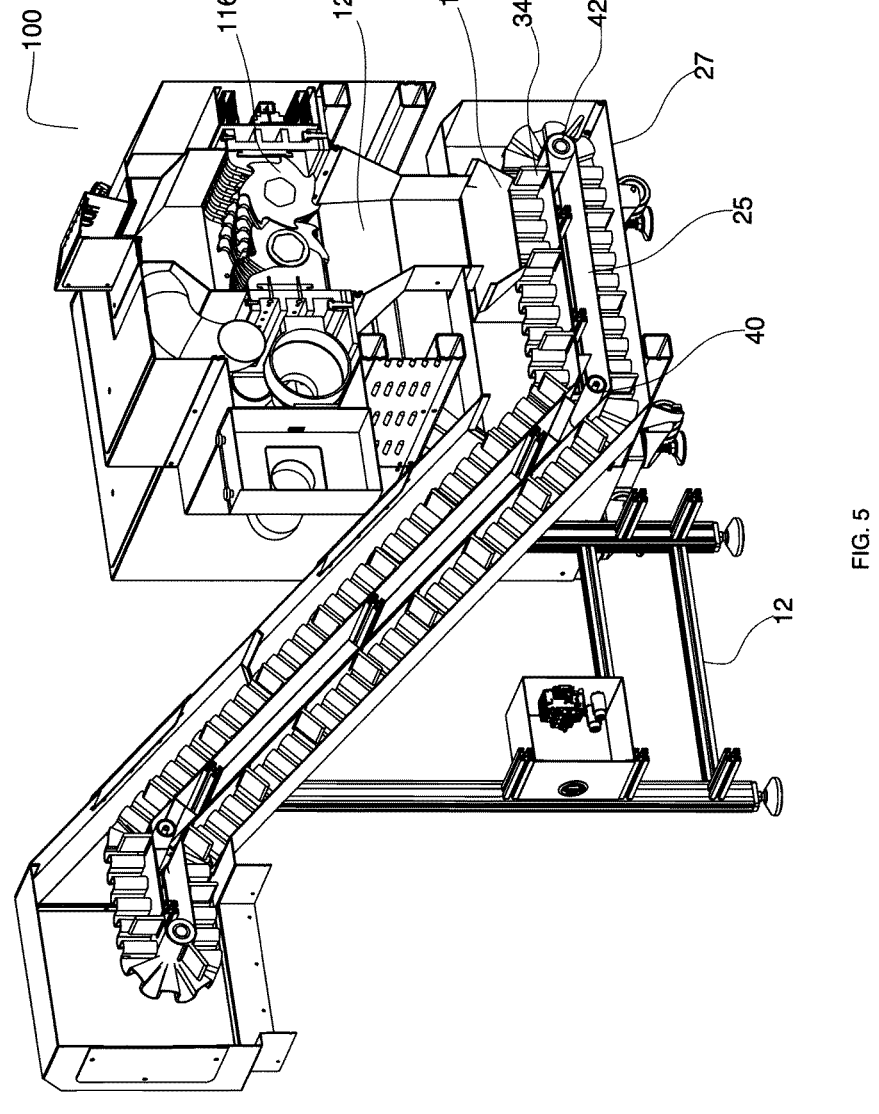
FIG. 5 is an enlarged perspective view of a shredder unit and conveyor apparatus.

FIG. 5 further illustrates the shredder teeth 116 with the shoot 122 leading to the intake 16. The idle roller 40 operates in conjunction with the return roller to keep the belt horizontal wherein the pockets 27 are formed for receipt of the maximum amount of material from the shoot 122.

Figure 6:
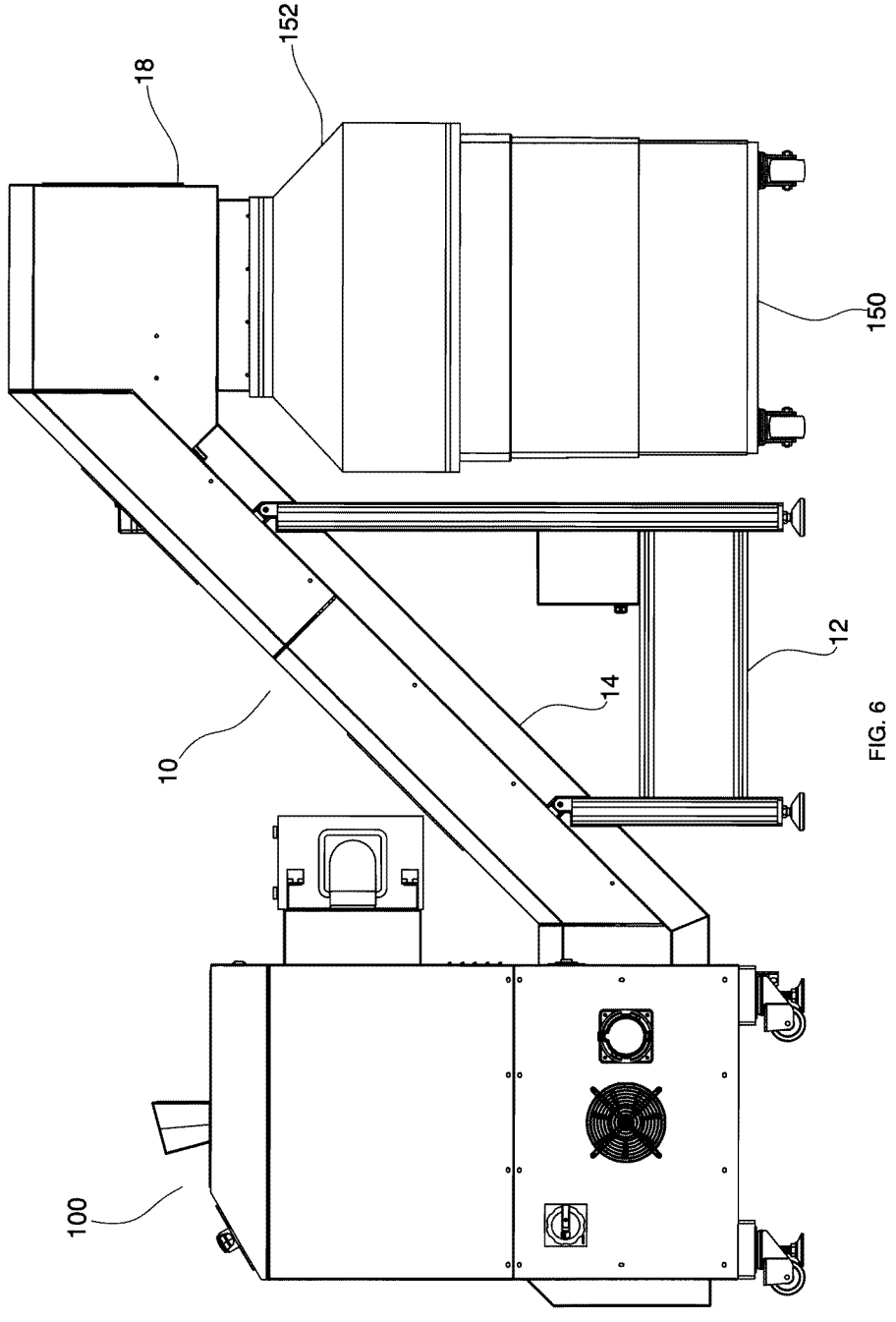
FIG. 6 is a side view of a shredder machine and shielded conveyor apparatus.
Figures 6A, 6B:
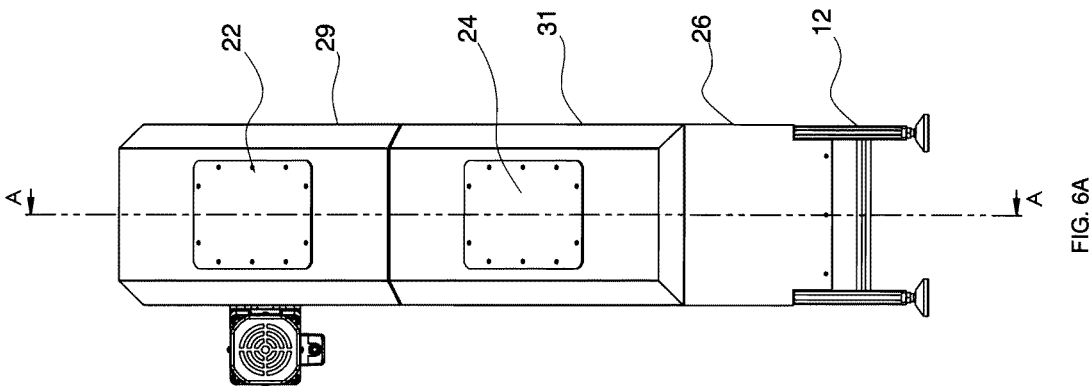
FIG. 6A is a front view of the conveyor apparatus.
FIG. 6B is a cross sectional view of FIG. 6A.

FIGS. 6A and 6B illustrate the conveyor belt 25 covered with a lower shield 26, mid shields 29, 31, and upper shield 27. The conveyor belt is illustrated with a continuous base 31 having divider walls spaced along its surface to segment the flow. The base 31 is constructed of a flexible material with each side wall incorporating corrugations that allow the side walls to compress during inward turns such at that provided by rollers 41, 43 and outward turns depicted by an end roller 45. The base, divider walls, and side walls define continuous pockets that receive shredded material and transport it without loss. The side walls maintain their height throughout belt movement, preventing shredded material from spilling over the edges during rotation of the belt.

FIG. 7 is a pictorial illustrating the shredder machine 100 coupled to the shield conveyor assembly 10 for delivery of waste to a transfer bin 150. A flexible shield 12 can be placed around the discharge end 18 so as to collect all debris into the bin 150 and reduce airborne dust.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is adapted to carry out the objectives and obtain the ends and advantages mentioned, as well as those inherent therein. The embodiments described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A shielded conveyor apparatus, comprising:
   a frame having a lower end positionable beneath a shredding machine, an upper end positioned a distance above said lower end, and inclined ramp therebetween;
   a conveyor belt forming a continuous loop around said frame with said lower end positionable beneath a shredding machine to catch and carry shredded material, said conveyor belt formed from a continuous base constructed of a flexible material, divider walls spaced along the base; and side walls formed integrally with said base, the side walls having corrugations that compress during inward turns and expand during outward turns, the base, divider walls, and side walls together defining continuous pockets for receiving and transporting shredded material from a bottom inlet to a top discharge;

a motor operatively coupled to the conveyor belt for rotation thereof; and a shield extending over the conveyor belt between the bottom inlet and the top discharge.

2. The shielded conveyor apparatus of claim 1, further comprising a sight glass positioned along the shield to allow viewing of the conveyor belt during operation.

3. The shielded conveyor apparatus of claim 1, wherein the cover is constructed of sheet metal.

4. The shielded conveyor apparatus of claim 1, wherein the cover is constructed of plastic.

5. The shielded conveyor apparatus of claim 1, wherein the opposing side walls of the conveyor belt cooperate with the divider walls to prevent shredded material from spilling off the conveyor belt during rotation.

6. The shielded conveyor apparatus of claim 1, wherein the divider walls are positioned at a predetermined distance along the conveyor belt to control the amount of shredded material transferred by each pocket.

7. The shielded conveyor apparatus of claim 1, wherein the divider walls are selected from the flexible material group consisting of: polyurethane, PVC, natural rubber, neoprene, nitrile, EPDM, silicone, or thermoplastic elastomers.

* * * * *